(12) United States Patent
Amar

(10) Patent No.: US 11,400,016 B2
(45) Date of Patent: Aug. 2, 2022

(54) MEDICATION STORAGE AND TRANSPORT CONTAINER

(71) Applicant: CaseMD, LLC, Waco, TX (US)

(72) Inventor: Neil Amar, Waco, TX (US)

(73) Assignee: CaseMD, Waco, TX (US)

( * ) Notice: Subject to any disclaimer, the term of this patent is extended or adjusted under 35 U.S.C. 154(b) by 0 days.

(21) Appl. No.: 16/383,305

(22) Filed: Apr. 12, 2019

(65) Prior Publication Data

US 2019/0314244 A1 Oct. 17, 2019

Related U.S. Application Data

(60) Provisional application No. 62/657,562, filed on Apr. 13, 2018.

(51) Int. Cl.
| | |
|---|---|
| *A61J 1/14* | (2006.01) |
| *B65D 51/24* | (2006.01) |
| *A61J 1/16* | (2006.01) |
| *B65D 81/38* | (2006.01) |
| *B65D 51/28* | (2006.01) |

(52) U.S. Cl.
CPC .............. *A61J 1/1418* (2015.05); *A61J 1/16* (2013.01); *B65D 51/242* (2013.01); *B65D 51/28* (2013.01); *B65D 81/3841* (2013.01)

(58) Field of Classification Search
CPC .......... A61J 1/1418; A61J 1/1412; A61J 1/16; B65D 51/242; B65D 51/24; B65D 51/28; B65D 43/021; B65D 39/16; B65D 39/08; B65D 1/40; B65D 81/3841; B65D 81/3837; B65D 81/3818; B65D 81/3869
USPC .......... 220/592.27, 592.2, 62.18, 62.11, 504, 220/503, 803, 802, 801, 789, 791, 212.5, 220/212, 293, 288, 521; 215/364, 355, 215/356, 227

See application file for complete search history.

(56) References Cited

U.S. PATENT DOCUMENTS

| | | | | |
|---|---|---|---|---|
| 1,488,810 | A * | 4/1924 | Fraser ...................... | A47K 5/12 |
| | | | | 132/314 |
| 1,534,609 | A * | 4/1925 | Rice ...................... | F01P 11/0214 |
| | | | | 220/802 |
| 1,771,123 | A * | 7/1930 | Johnson ............. | B65D 81/3846 |
| | | | | 215/277 |
| 2,881,936 | A * | 4/1959 | Piker .................... | A47J 41/0077 |
| | | | | 215/13.1 |
| 2,925,187 | A * | 2/1960 | Bramming ........... | A47J 41/0011 |
| | | | | 215/12.1 |
| 2010/0282762 | A1 * | 11/2010 | Leonard ............. | B65D 81/3841 |
| | | | | 220/592.01 |
| 2019/0152655 | A1 * | 5/2019 | Lake .................. | B65D 81/3846 |

* cited by examiner

*Primary Examiner* — Robert J Hicks

(57) ABSTRACT

A reversibly sealed, double-walled vacuum canister for housing temperature-sensitive medications and protecting them from ambient temperatures outside of recommended storage temperatures, and including multiple storage areas within the canister's temperature-protected cavity.

2 Claims, 17 Drawing Sheets

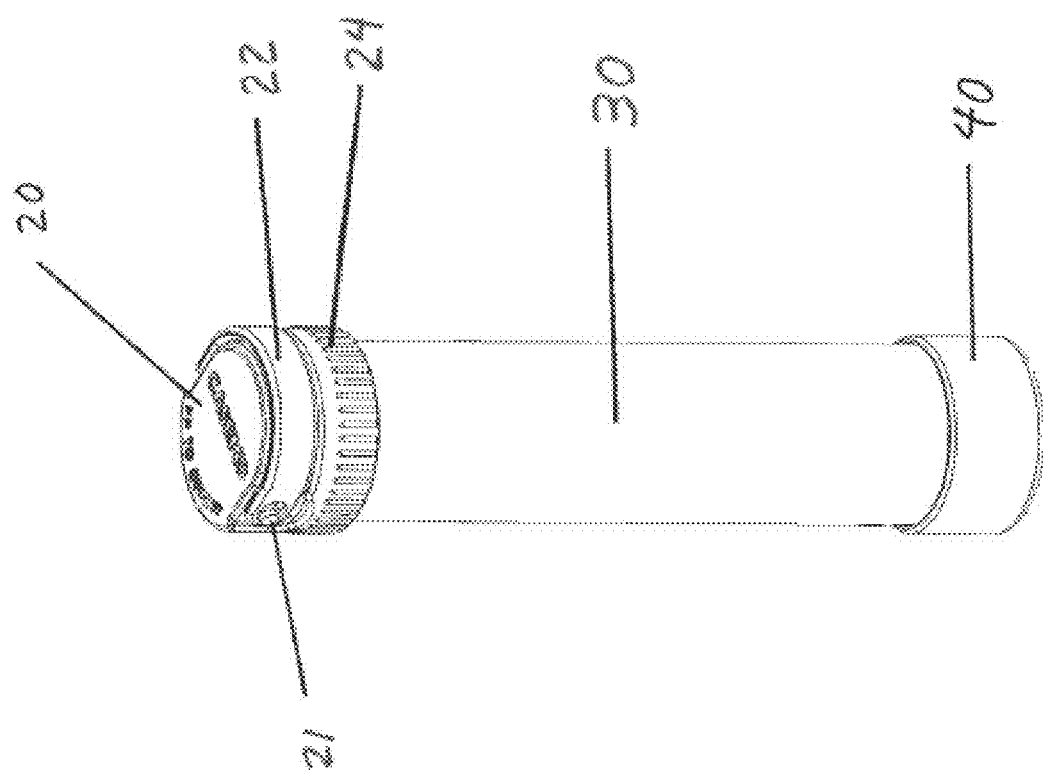
Fig. 1

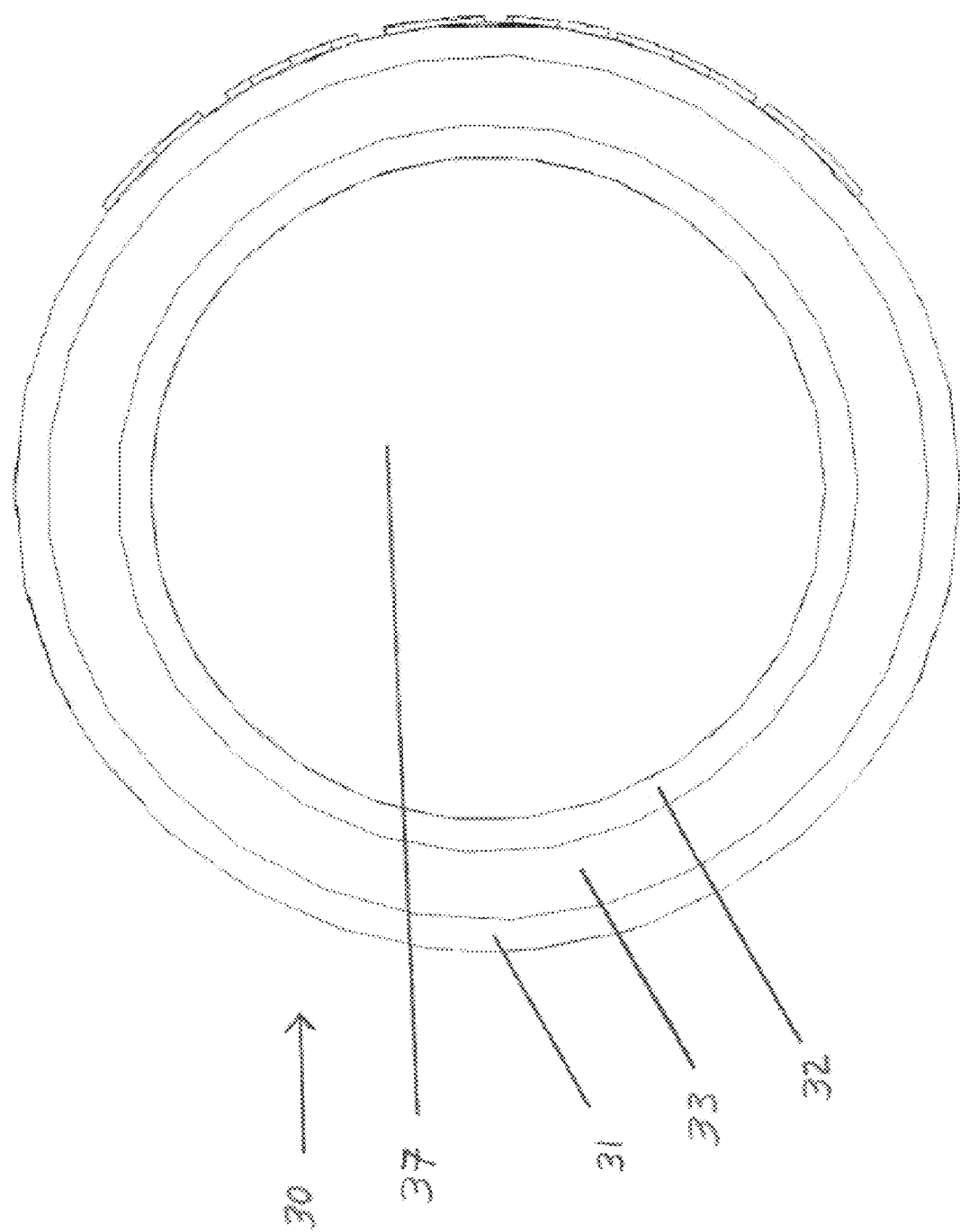

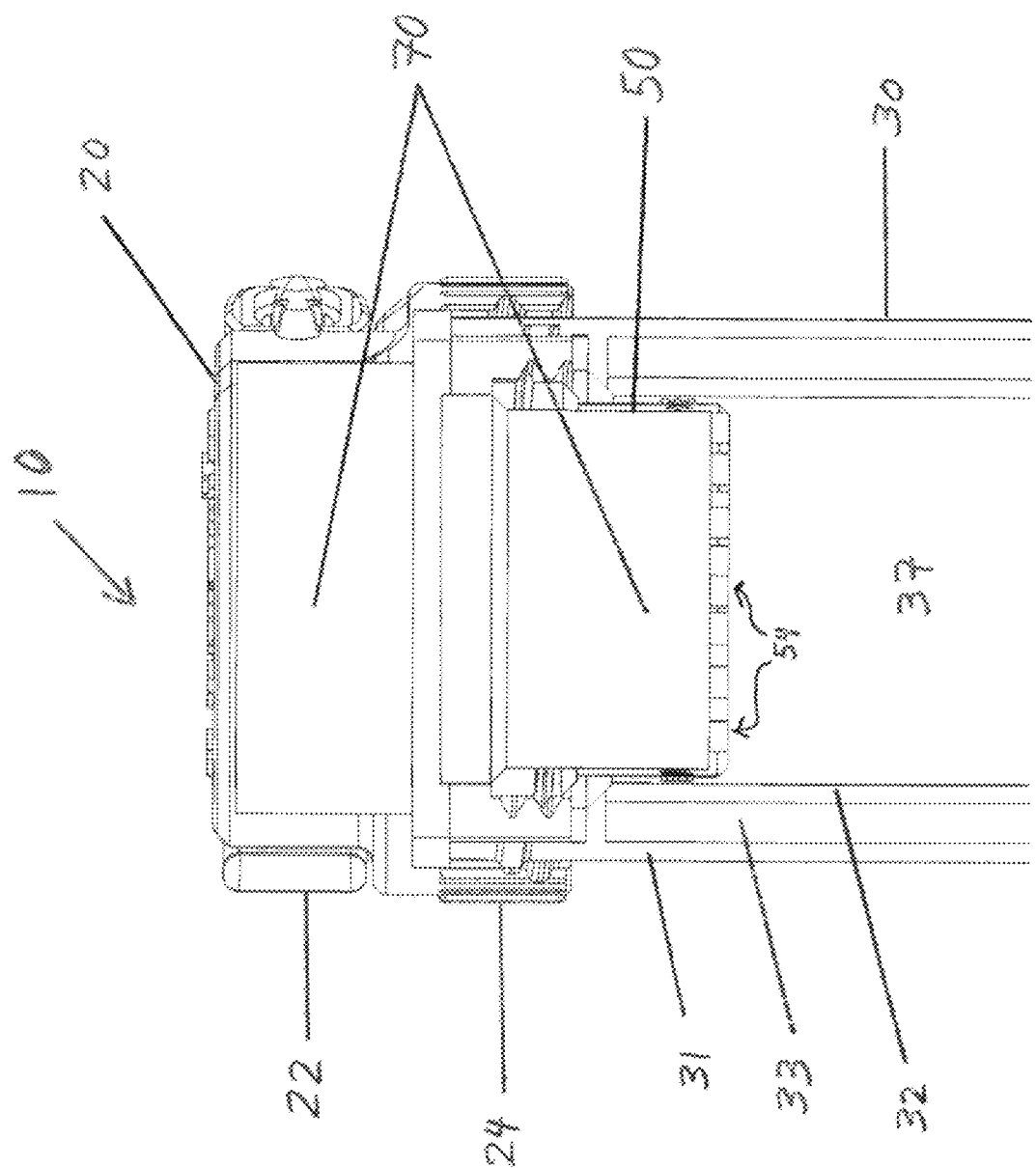

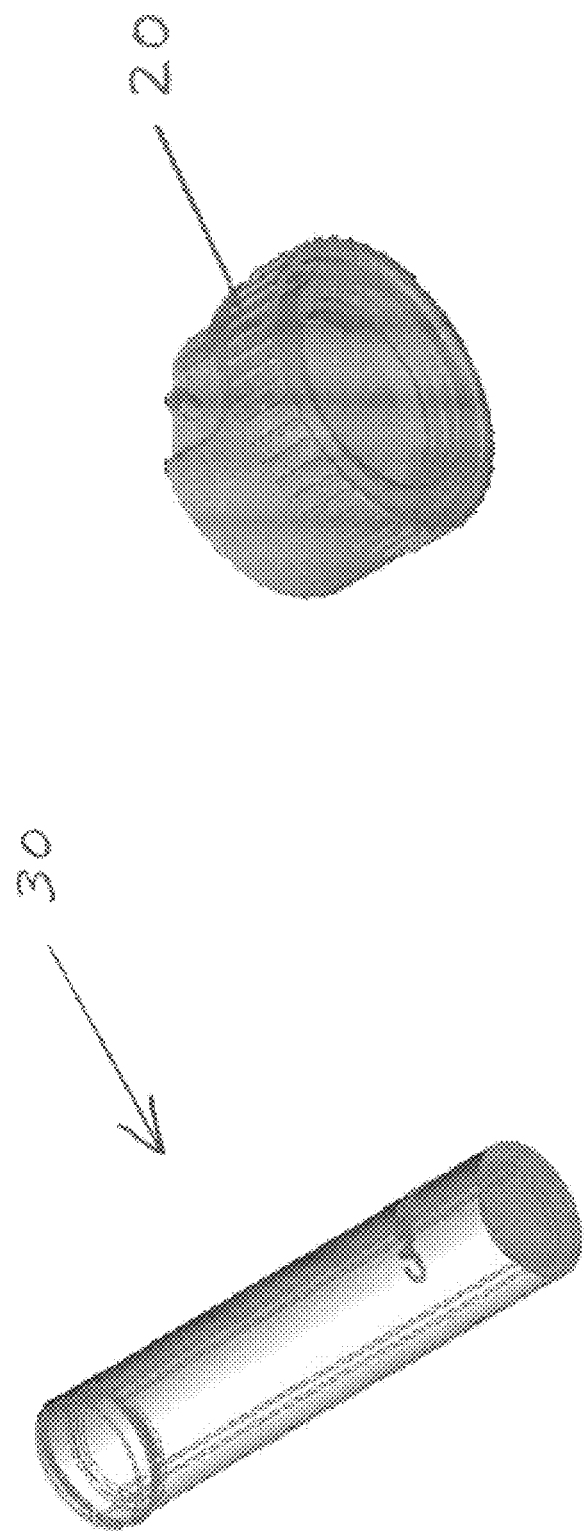

MEDICATION STORAGE AND TRANSPORT CONTAINER

CITATION TO PRIOR APPLICATIONS

The present application claims priority for purposes of this application to U.S. Provisional Application Ser. No. 62/657,562, entitled "Medication Storage and Transport Container" and filed Apr. 13, 2018.

TECHNICAL FIELD OF THE INVENTION

The present invention is generally directed to medication storage containers and insulated, tubular containers for the transport and storage of medications.

BACKGROUND ART OF THE INVENTION

Persons who are prescribed certain temperature-sensitive medications must often carry such medications in environments in which the ambient temperatures are either higher or lower than will preserve the medication without temperature-related alteration or degradation.

For example, epinephrine auto-injectors, nitroglycerin pills, insulin vials, and albuterol inhalers are all medications that, if exposed to environments involving temperatures significantly higher or lower than recommended storage temperatures, may suffer deleterious degradation or chemical transformations. This, in turn, may render the medication less efficacious, or even harmful. Such circumstances can arise when a temperature-sensitive medication is taken or stored in an automobile (on a hot, Summer day, for example), in luggage during airline travel, or even in one's purse or backpack, if walking on a particularly hot or cold day.

As, stated, an example of a temperature-sensitive medication is the popular EpiPen® epinephrine auto-injector. This product is recommended to be stored at a storage temperature in the range of 68° to 77° Fahrenheit. It is unrealistic to expect that patients who must carry EpiPen® auto-injectors at all times will always be willing, or even able to remain constantly out of environments involving temperatures significantly above or below the recommended storage temperature range.

There have been a number of attempts in the prior art to address the concerns just described. For instance, some prior art devices involve a container that includes a phase change material that absorbs or gives off heat, thereby moderating the effect of divergent, ambient temperatures on any medication contained therein. In other instances, miniature refrigeration systems powered by batteries have been used to maintain a thermal environment for medication container transport systems. These attempts at solving the problem have been somewhat costly and have frequently not included certain user-friendly aspects that would make the containers better suited for use by patients, especially elderly patients.

DESCRIPTION OF A PREFERRED EMBODIMENT OF THE INVENTION

The present invention is embodied in a medication storage and transport container (sometimes referred to herein as the "medication container") that may be used to store and transport temperature-sensitive medications. Medications for which embodiments of the present invention will provide protection as characterized include, without limitation, and as identified above, epinephrine, nitroglycerin, some types of insulin, and inhalers that must be stored at "room temperature" conditions.

Embodiments of the present invention are medication containers that provide at least a protective, temperature buffering means for at least modulating the immediate exposure of such medication to ambient temperatures outside of the container. The medication container hereby described and disclosed can be used to reduce, and in some circumstances, at least for a time, eliminate entirely the risks directly associated with exposure of temperature-sensitive medications, in particular, to ambient temperatures that are significantly above or below the temperature at which such medications are recommended to be stored.

Even when in extreme conditions, at least for a time, medication housed within such a container will remain within a desired temperature range if the medication itself, and the container were, before such time, acclimated to a temperature well within such desired range.

For example, if the desired temperature range for the above-described auto-injector is 68° to 77° Fahrenheit, and one is taking the container with an auto-injector stored therein to an outside event in Texas in August, it would be advisable to cool the container and the medication to approximately 68° Fahrenheit to provide the longest period of time during which the container could maintain the auto-injector within the desired range. Conversely, were one to take this same medication to an outside event in Minnesota in the Winter, one would ideally stabilize the medication and container at roughly 77° Fahrenheit to, again, maintain the auto-injector within the desired range for the longest time possible.

The prior examples are extreme ones, and circumstances involving less extreme temperature deviations or temporal exposures will not necessarily involve such prior planning—maintaining the medication and container until acclimated at "room temperature" will protect the medication for such times as would typically be involved with errands, short walks or runs, and the like, in moderately higher or lower temperatures than a medication's recommended storage temperature.

Embodiments of the present medication container invention will comprise a double-walled vacuum flask cylinder, defining a centrally-positioned interior primary storage cavity that is typically centered, substantially along its central, longitudinal axis and concurrently, substantially on a medial plane that is orthogonal thereto.

A first end (the "bottom end") of the double-walled vacuum cylinder is occluded, typically by a cylindrical cap structure. A removable top cap for reversibly occluding the "top end" of the cylinder preferably engages with the cylinder via a threaded engagement, whereby the interior surface of the top cap exterior apron is threaded to threadingly interface with complimentary threads formed on the exterior of the cylinder, at the top end thereof.

The top cap may also include a concentric, interior apron for interfacing with an auxiliary container cup (for providing an auxiliary or secondary, temperature-protected storage area). The annular space between the outer and interior aprons of the top cap is such that it receives the annular, top end of the double-walled vacuum cylinder, as the top cap is threadingly (or otherwise) interfaced with the cylinder.

The exterior surface of the rim of the cup is, in the preferred embodiment, fashioned with threads, complimentary threads for which are fashioned within the interior annular surface of the top cap's interior apron. The cup that is reversibly attached thereto, and that is sized and shaped for telescopic reception within the storage cavity, extends from the top cap's interior surface into the storage cavity when the top cap is interfaced with the cylinder.

While threaded interfaces are described, it should be understood that alternative interfacing means between various reversibly engaged components of the present system are acceptable as well, such as telescopic, non-threaded nesting arrangements, magnet-based interfaces, hinged interfaces, and/or hook and loop fastening.

In a simplest embodiment of the invention in its broadest scope as presently contemplated, the double-walled vacuum flask cylinder is comprised of an outer vessel wall in which an inner vessel wall is axially nested. In a preferred embodiment, the inner and outer vessel walls are permanently attached in the nested, concentric configuration such as by annular sealing bridges or caps at each respective end of the cylinders that form the inner and outer walls to thereby permanently define and seal an air-tight insulating cavity.

In an alternative embodiment, such as in which the insulating cavity is sealed only by engagement of the top cap as earlier described, the inner and outer walls may be secured in their concentric arrangement by conventional means, such as welded linkages, frictionally engaged spacers, and/or adhesively secured spacers.

In either event, the resulting double-walled structure defines (either permanently in the first example, or temporarily when the top cap is engaged in the second example), an insulating space between the outer vessel wall and the inner vessel wall. In the preferred embodiment (with a permanently-sealed insulating cavity) the structure is sealed in an environment at ambient pressure less than typical ambient pressure, or the space is otherwise evacuated such that the pressure within the resulting, sealed insulating space is permanently less than the typical, ambient atmospheric pressure outside of the outer vessel wall.

The reduced amount of gas in the insulating region (which may be air or another gas or gas mixture) creating a vacuum or partial vacuum provides insulating capability because it limits the amount of heat energy transferred by conduction between the outer vessel wall and the inner vessel wall. In this respect, the double-walled vacuum flask cylinder is similar to a traditional vacuum insulated flask or thermos that might be used to preserve the warm temperature or cold temperature of perishable food items stored inside the vacuum insulated flask or thermos.

Once a medication is placed within the first medication storage cavity, the open mouth of the double-walled vacuum flask cylinder may be closed by attaching the top cap to the top portion of the double-walled vacuum flask cylinder by attachment means as described. When the top cap is affixed to the top portion of the double-walled vacuum flask cylinder, the vessel walls and the insulating space disposed there-between serve to insulate the medication that has been placed within the first medication storage cavity.

Referring again to the inner compartment cup that provides the secondary, protected storage area, one embodiment of the cup exhibits perforations such that when the top cap is interfaced with the double walled vacuum flask cylinder, and the cup is, in turn, affixed to the top cap, the second medication storage chamber communicates with the first medication storage chamber by means of the perforations in the floor of the inner compartment cup.

The top cap of the medication container is additionally provided with a flip-up handle that is attached to the top cap. The flip-up handle has the capability to be flipped up into a configuration in which the main portion of the handle is positioned above the top cap in an arch-like fashion that provides an attachment spot for attaching the medication container to a bag by means of a clip, tether, string, rope, carabiner, zip-tie, or similar attachment means. The flip-up handle can be rotated downward in relation to the upper surface of the top cap and placed into a stowed configuration in which the flip-up handle is out of the way and does not protrude beyond the upper surface of the top cap itself. The flip-up handle is a user-friendly component in that it provides for quickly attaching the medication container to luggage, back packs, purses, or other similar items. In a preferred embodiment, the flip-up handle is a semicircular loop that is pivotably connected to the top cap by means of one or more pivot point connection members such that it may be flipped-up to where it is connected to the top cap but appears as an arch above the upper surface of the top cap. The flip-up handle is unique in the sense that it allows patients with arthritic conditions in their fingers, hands, or wrists to flip the flip-up handle upwards around the pivot point connection(s) so as to form the arch-like structure described above in which patients with arthritic hands and fingers can insert their fingers underneath the flip-up handle, which facilitates opening and closing of the container by such patients.

In an alternative embodiment of the invention, an additional cylindrical auxiliary layer of impact-resistant and/or insulating material (preferably having both characteristics) is telescopically nested within the primary storage cavity. This additional, protective layer may be made of an impact resistant and thermal insulating material such as neoprene rubber, silicone, styrofoam, foam fill, or the like. The auxiliary layer may be permanently adhered to the inner surface of the inner vessel wall, but may also be a removable. In the latter case, the auxiliary layer may be omitted entirely by a user (such as if additional space is needed to house the desired medication), or the layer may, in effect, serve as a secondary enclosure into which the mediation is placed, and then, in turn, placed within the primary storage cavity. Furthermore, with respect to addressing the latter mode, the secondary enclosure may be configured in any number of conventional ways to be a storage unit for use between transits within the overall unit. In this case, the auxiliary layer may not be strictly a concentric, telescopically-inserted cylinder, as first described, but rather, in effect, a "bag" or other container that is merely housed within the primary storage cavity.

In a preferred embodiment of the invention, the entire medication container and its components, excluding only the auxiliary protection member, top cap, and bottom cap, is made of stainless steel due to stainless steel's strength, resistance to corrosion, and ability to be easily cleaned. While it is possible to also use stainless steel for the construction of the entire medication container and all of its component parts, in a preferred embodiment the top cap, including the inner compartment cup, and the bottom cap, are each made of plastic, rubber, or a combination of such polymeric materials. With regard to the top cap and inner compartment cup, to the extent that they may be made of plastic, plastic is more easily gripped by arthritic or otherwise weakened hands of older patients. With regard to the bottom cap, to the extent that it may be made of rubber, it may be adhered to the bottom portion of the vacuum flask cylinder so that the medication container will have more traction when placed on surfaces and it will be less likely to slide off of an uneven surface when the medication container is stood on its bottom end and also will potentially facilitate opening of the container to the extent that it will provide some additional grip for making the container easier to open.

Alternatively, the medication container and its components, other than the bottom cap, may be made of other metals such as titanium.

As discussed above, in certain embodiments the top cap of the medication container is not a solid cylinder, but rather, it features a hollow top cap interior compartment. In those embodiments, a separate inner compartment cup may be reversibly affixed to the top cap of the medication container such that the inner compartment cup and the top cap interior compartment jointly cooperate to provide a single, additional storage space in addition to the primary medication storage chamber (the primary medication storage chamber is sometimes referred to herein as the "first medication storage chamber") that may be nested within the top of the medication container when the inner compartment cup is affixed to the top cap and that assembly is further affixed to the top of the vacuum flask cylinder. However, in a preferred embodiment of the medication container, rather than the single additional storage chamber described, the top cap will feature an interior top cap chamber and a separate pendent top cap cup that will actually function as two separate storage spaces, both of which may be reversibly connected to the top cap, and both of which may be used for storage of items in addition to whatever medication may be stored below within the first medication storage chamber of the medication container. In such preferred embodiment, the interior top cap chamber will serve as a first additional storage space and the pendent top cap cup may serve as a separate, second additional storage space. In such preferred embodiment, the interior top cap chamber will be contained within the top cap, will be separable from the pendent top cap cup, and will provide a first additional storage space within the top cap for items such as extra foam insulation, electronics, a battery pack, or sensors. Additionally, the pendent top cap cup may be affixed to the top cap such that it is positioned below and pendent from the interior top cap chamber in order to provide a second additional storage space.

DETAILED DESCRIPTION OF THE ACCOMPANYING DRAWINGS

FIG. 1 is a perspective view of an embodiment of the medication container of the present invention, identified generally by the reference number 10. Preferred embodiment container 10 includes a top cap 20 in a configuration for threaded engagement with the top of a vacuum flask cylinder 30 (with corresponding threads) and wherein a bottom cap 40 is sealingly adhered to, or otherwise integrally formed as the bottom of the vacuum flask cylinder 30 such that the bottom cap 40 serves as the base of the medication container 10 when it is standing vertically on a surface. FIG. 1 also illustrates a flip-up handle 22 that is pivotably attached to the top cap 20 by handle connection members 21. The top cap 20 is also preferably provided with grippable protrusion members 24 that are (again preferably) arranged in a staggered pattern around the circumference of its external surface. This surface texturing is provided to enhance graspability and to facilitate easier opening of the medication container 10, particularly by arthritic and other users who may benefit from such means for facilitating opening and closing of container 10.

FIG. 2 is a side view of the medication container 10 that illustrates the same basic features as FIG. 1. In alternative embodiments, the top cap 20 may be affixed to the top of the vacuum flask cylinder 30 by other reversible affixation means, such as snapping the top cap 20 in place onto the vacuum flask cylinder 30, or connecting the top cap 20 to the vacuum flask cylinder with a hinge or other similar means of reversible affixation. It should also be appreciated that flipping the flip-up handle 22 upwards by means of pivoting around the handle connection members 21 will allow for the flip-up handle 22 to be used by patients to place their fingers around and/or through the flip-up handle in order to facilitate opening or closing the medication container 10.

FIG. 3 is an exploded perspective view of preferred embodiment medication container 10 with a few additional components shown in order to further illustrate aspects of the invention. As can be visualized in FIG. 3, an inner compartment cup 50 may be configured for threaded engagement with the bottom side of the top cap 20. FIG. 3 also illustrates the vacuum flask bottom 36 that would normally be hidden due to being covered by the bottom cap 40 because the bottom cap is normally adhered to, and surrounds, the vacuum flask bottom 36. FIG. 3 also illustrates a first medication storage chamber 37 and cylinder screw thread 38. When the top cap 20 is threadingly interfaced with the top of the vacuum flask cylinder 30, it is accomplished by screwing the cylinder screw thread 38 into outer screw thread receptacles (not shown) provided within the top cap 20 as reversible affixation means.

FIG. 4A illustrates a cross section view of the vacuum flask cylinder 30 along plane 4-4 which extends into the page in FIG. 2. As shown, the vacuum flask cylinder 30 is comprised of an outer vessel wall 31 an inner vessel wall 32 and an insulating space 33 that is disposed between the outer vessel wall 31 and the inner vessel wall 32. As shown in FIG. 4A, the first medication chamber 37 is defined by the inner surface of the inner vessel wall 32. The bottom cap is omitted from FIG. 4A and is not illustrated.

FIG. 4B illustrates a cut-away of a perspective view of the medication container 10 in which the medication container 10 is visualized from the level of plane 4-4 of FIG. 2 and extending down to the bottom cap 40 that cups the bottom portion of the vacuum flask cylinder 30. The inner vessel wall 32, outer vessel wall 31, insulating space 33, and the first medication storage chamber 37 are again illustrated in FIG. 4B.

FIG. 5 is a top view of the top cap 20 illustrating the flip-up handle 22 in a stowed position. The flip-up handle 22 is pivotably connected to the top cap 20 by handle connection members 21. In practice, the flip-up handle 22 may be rotated upward or "flipped-up" by pivoting the flip-up handle 22 around the handle connection members 21. FIG. 5 also illustrates a multiplicity of grippable protrusion members 24 that are located on the outer surface of the top cap 20.

FIG. 6 is a cross section view of the top cap 20 along plane 6-6 which extends into the page in FIG. 5. As illustrated, the top cap 20 comprises an interior compartment 29 that is an open cylindrical void within the body of the top cap 20. The top cap 20 further comprises an outer screw thread receptacle 26 and an inner screw thread receptacle 28. The outer screw thread receptacle 26 cooperates with a cylinder screw thread (not illustrated) to reversibly affix the top cap 20 to the vacuum flask cylinder (not shown). The inner screw thread receptacle 28 cooperates with a cup screw thread (not illustrated) to reversibly affix the inner compartment cup (not shown) to the top cap 20.

FIG. 7 is a perspective view of the inner compartment cup 50 that is comprised of a cup floor 52, a multiplicity of ventilation holes 54 that are perforations in the cup floor, a cup wall 56, and the cup screw thread 58. The cup screw thread 58 cooperates with the inner screw thread receptacle (not illustrated) to reversibly affix the inner compartment cup 50 to the top cap (not shown). When the inner compartment cup 50 is affixed to the top cap (not shown), the inner compartment cup 50 and the interior compartment (not illustrated) jointly define a second medication storage chamber (not illustrated) that may be used to store and transport a second medication or a desiccant material within the medication container. Though not illustrated, it should be appreciated that the second medication storage chamber formed by reversibly affixing the inner compartment cup to the top cap may be used for purposes other than storage of medications or desiccant material. For instance, extra foam insulation, electronics, a battery pack, sensors, or a phase change material could be stored or transported within the second medication storage chamber.

Figure 2:
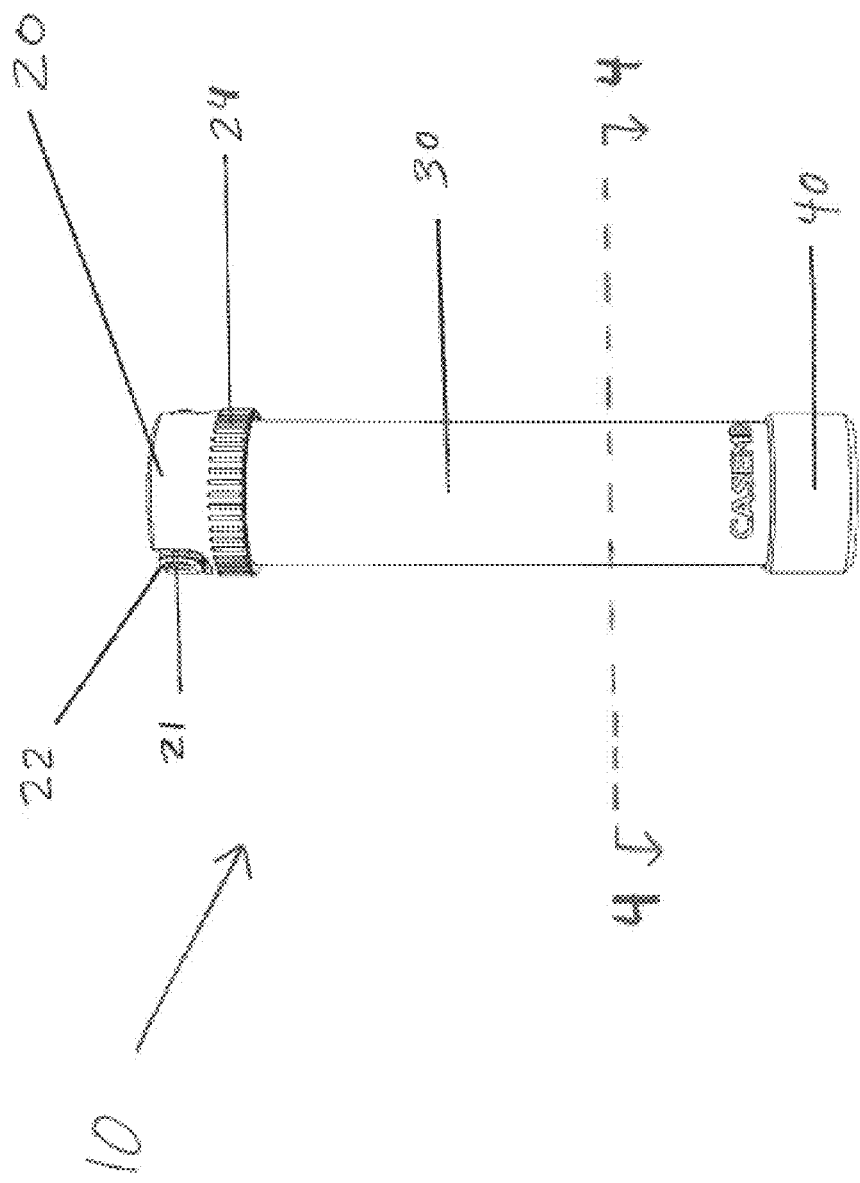
Figure 3:
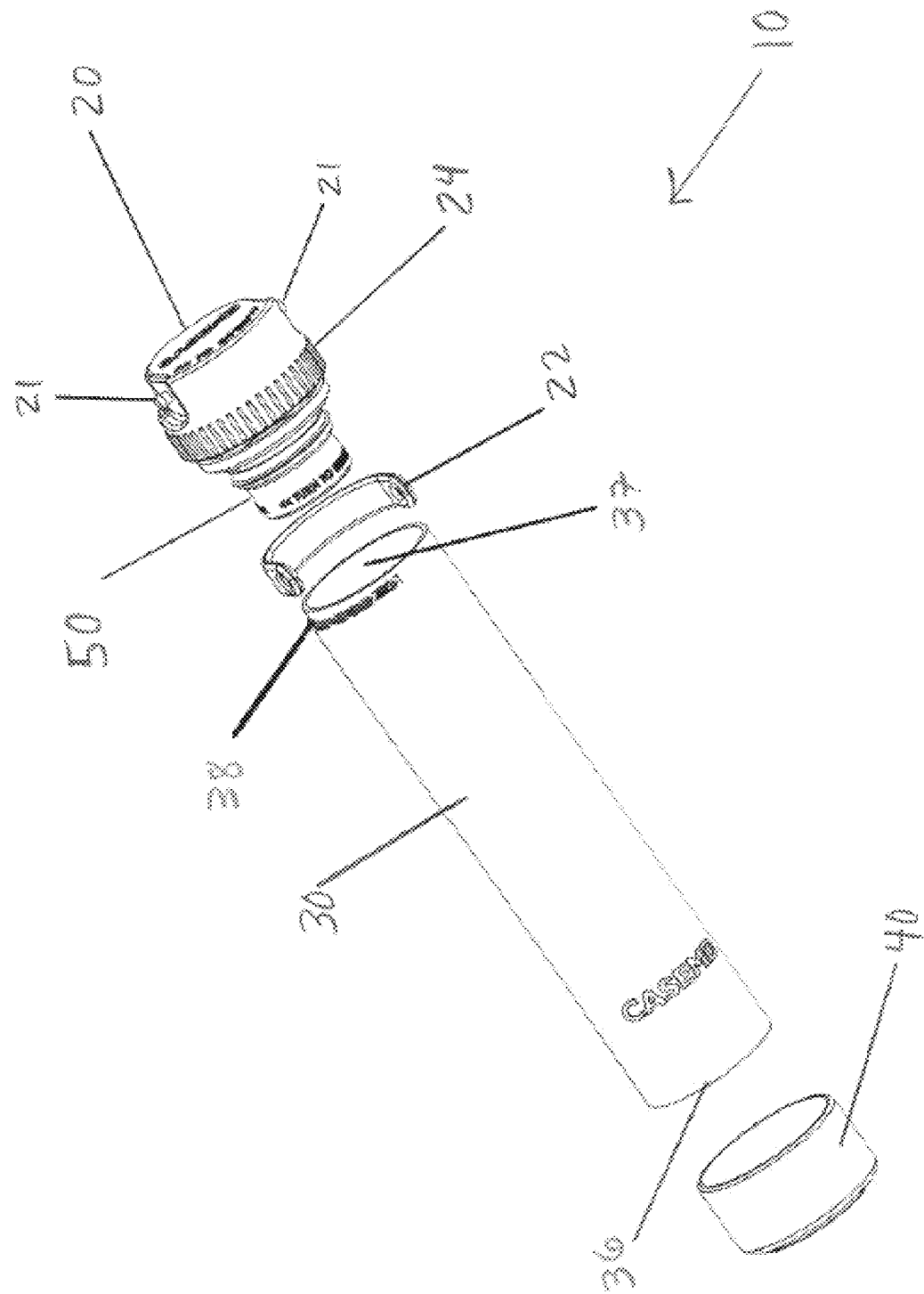
Figure 4B:
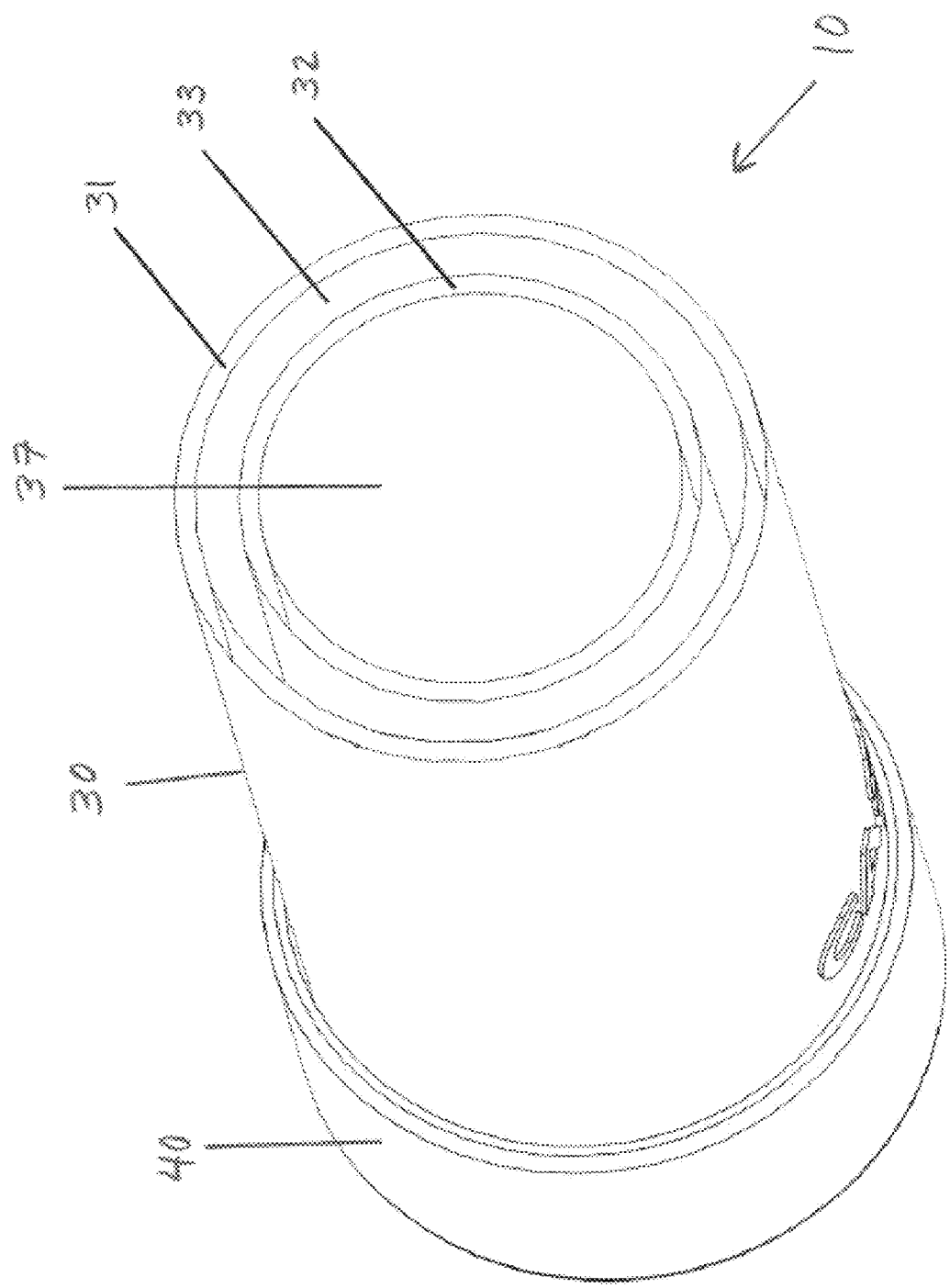
Figure 5:
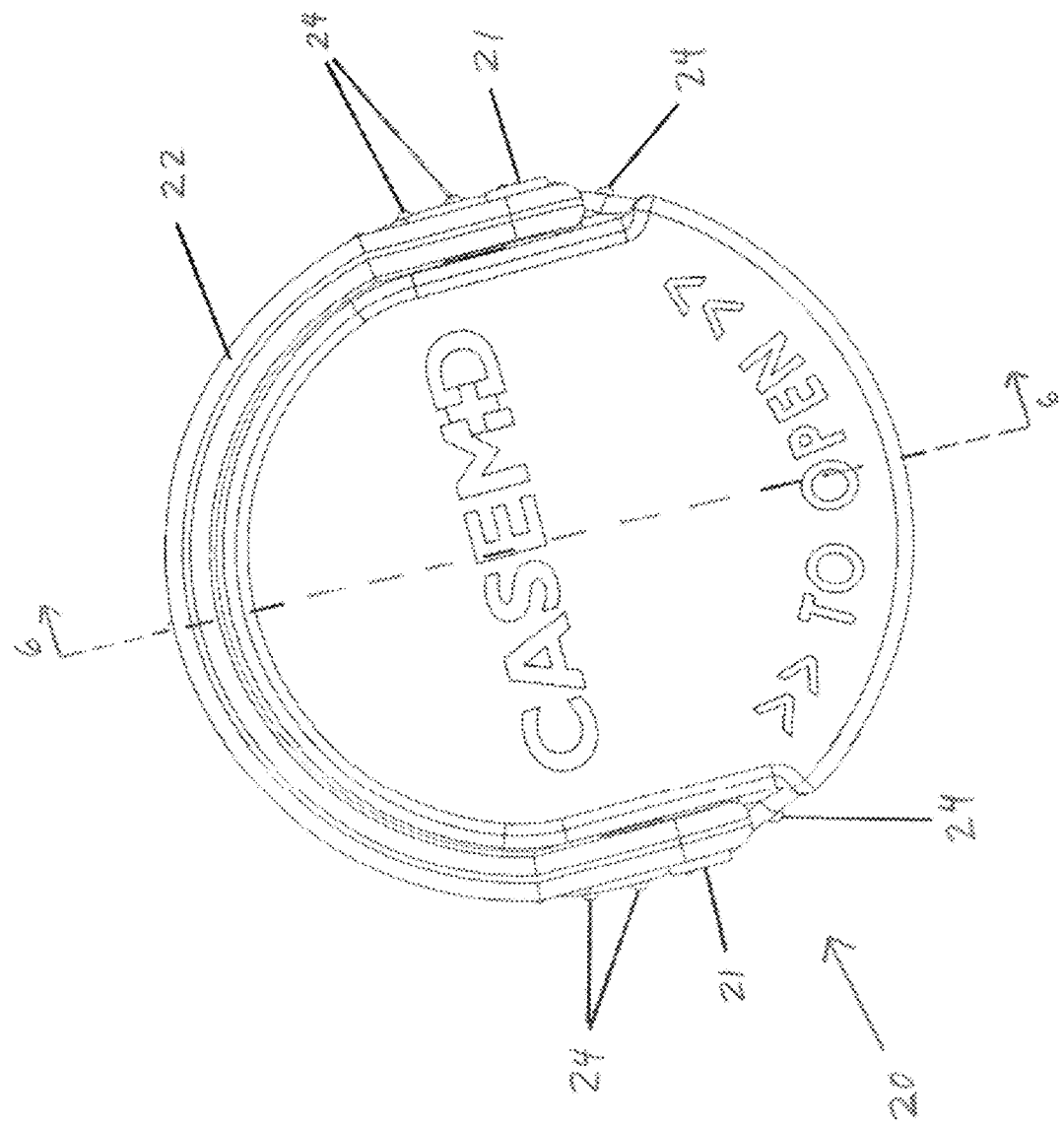
Figure 6:
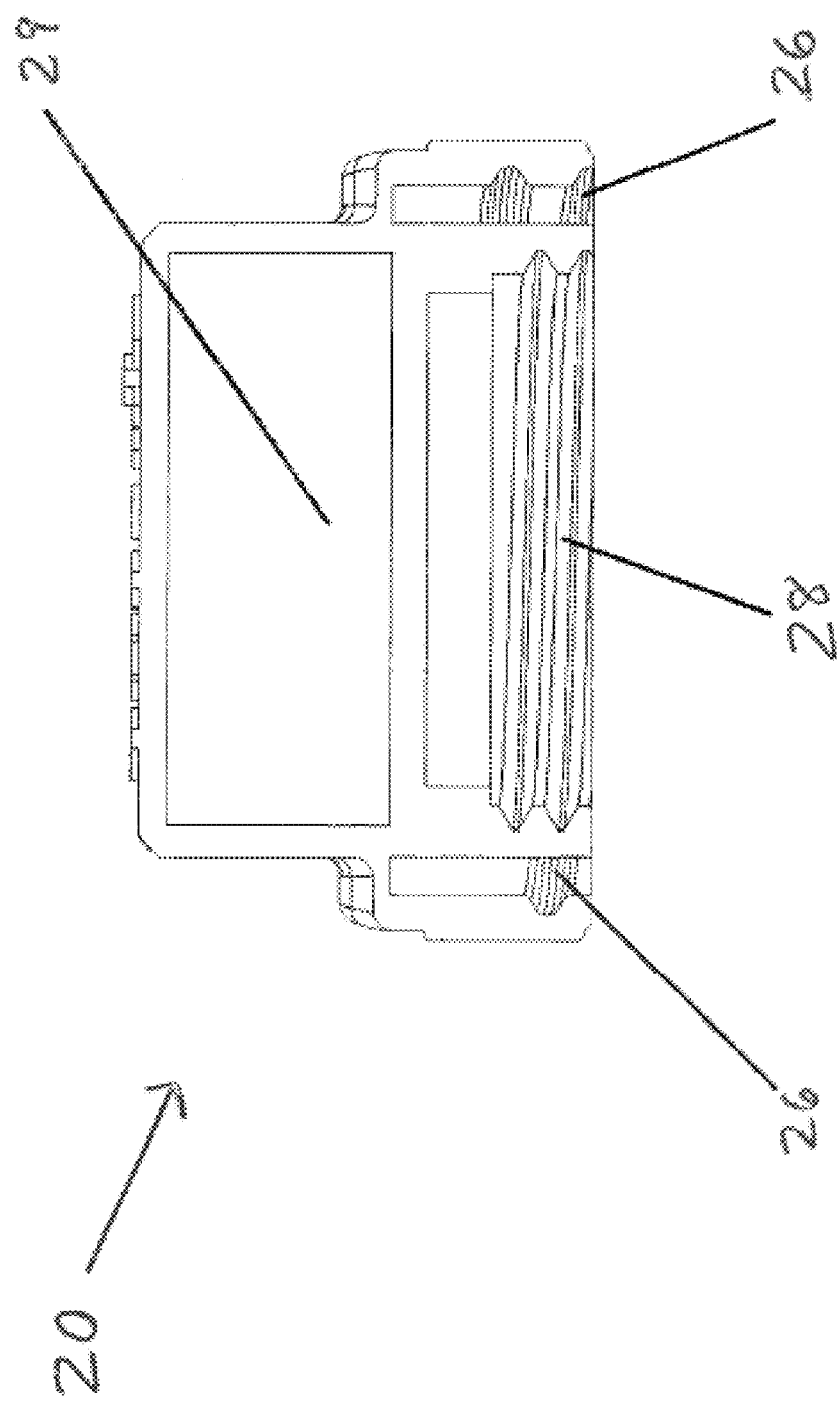
Figure 7:
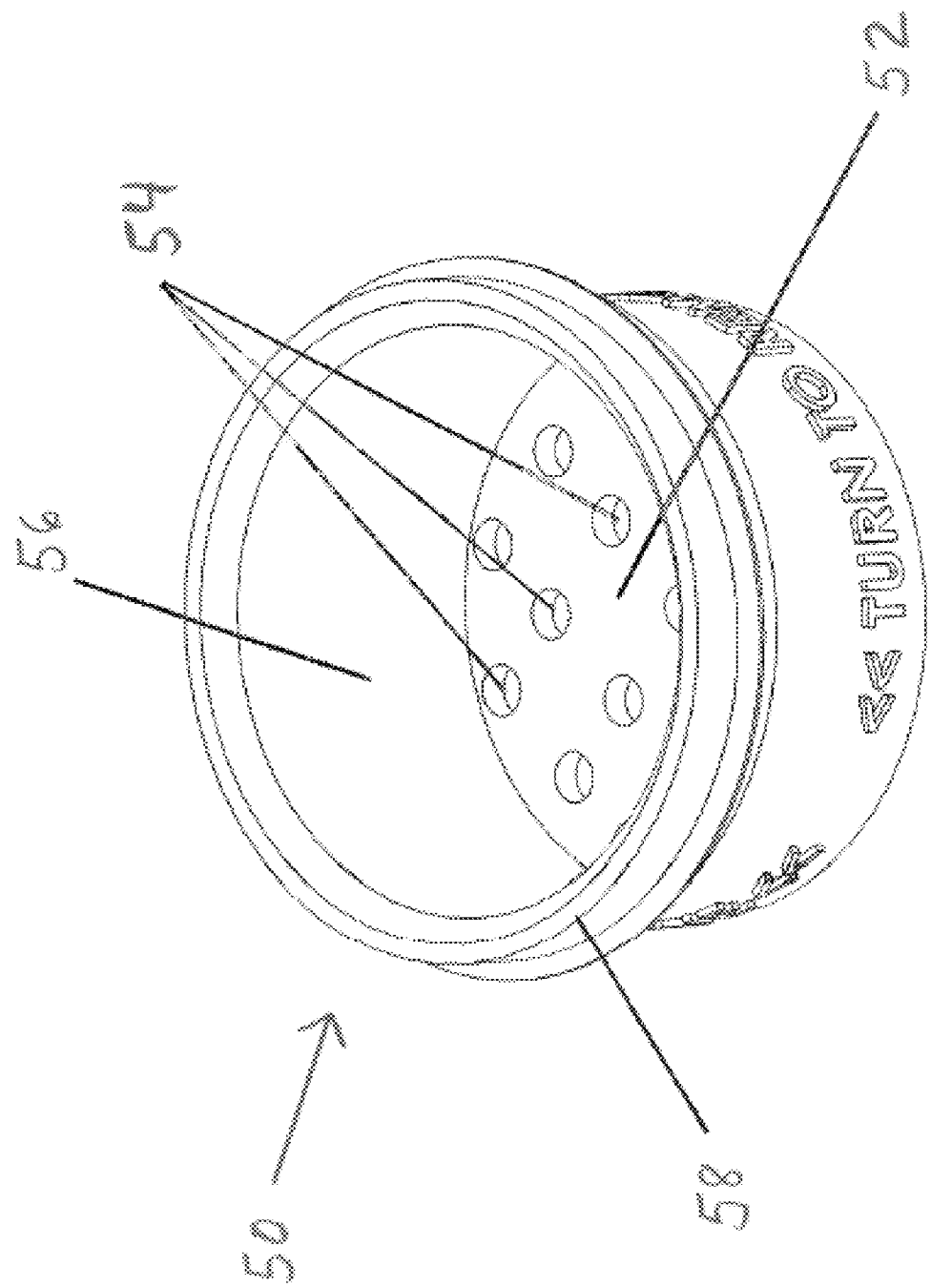
Figure 8:
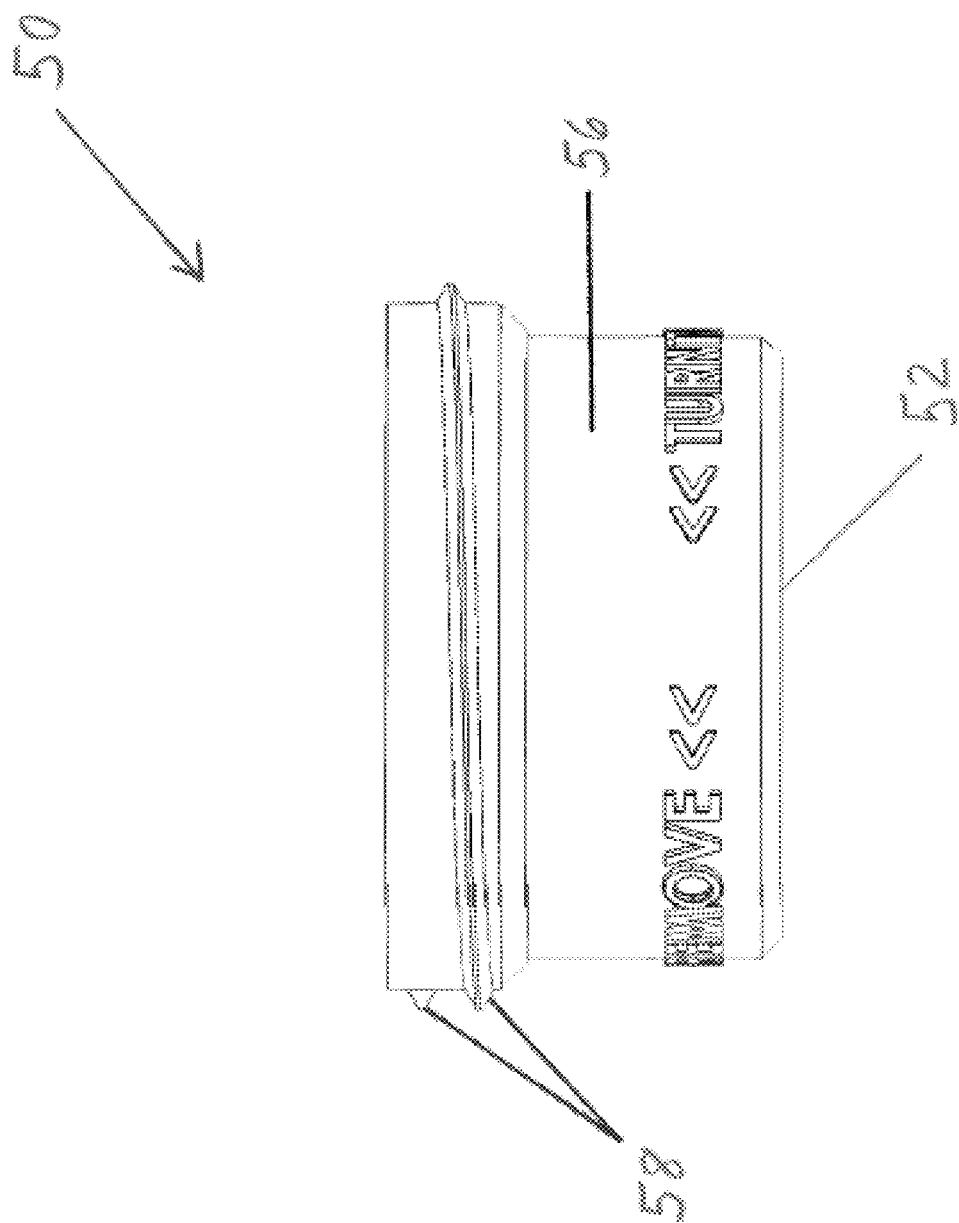
FIG. 8 is a side view of the inner compartment cup 50 that further illustrates some of the same features shown in FIG. 7.
Figure 9A:
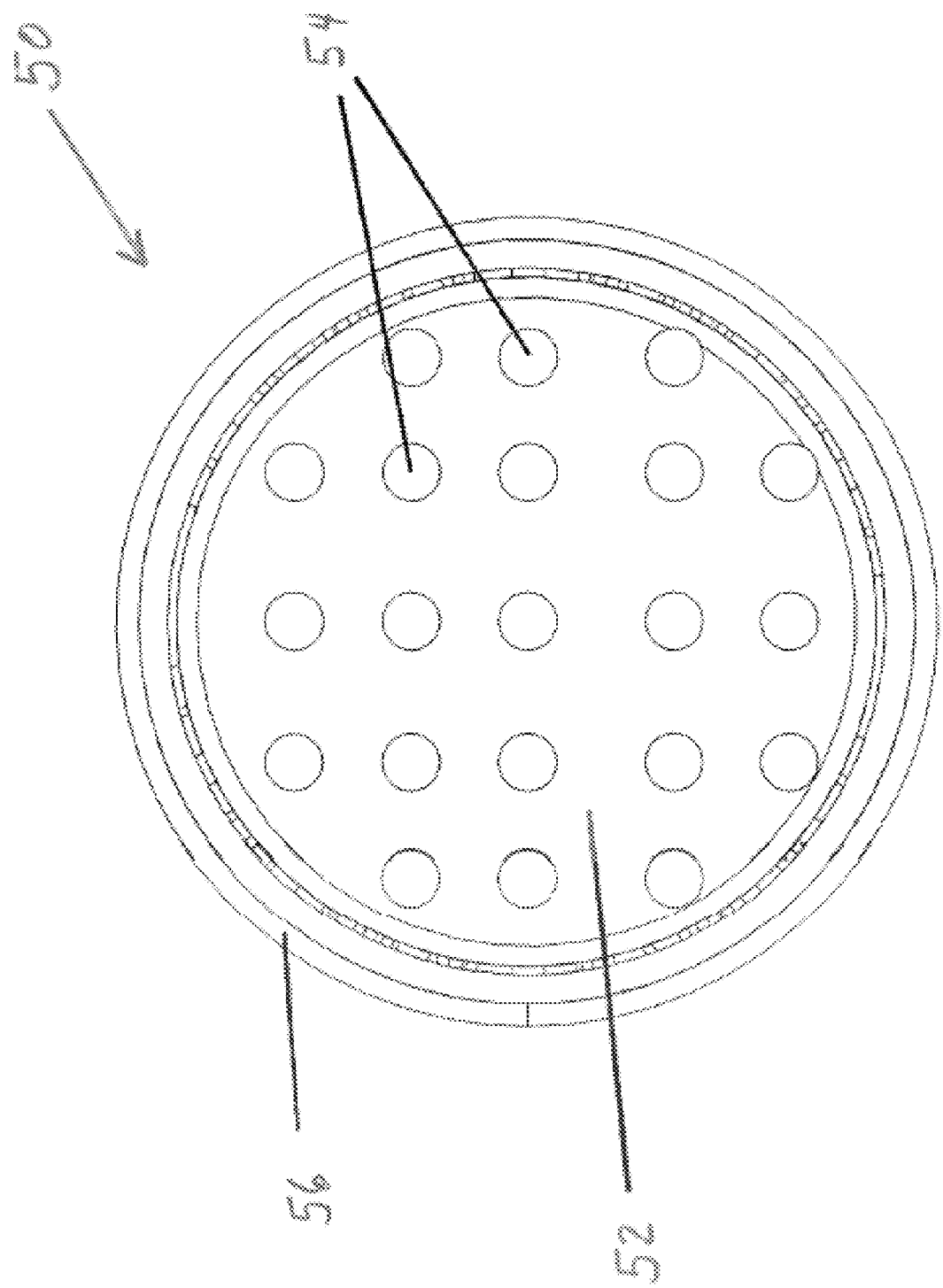
FIG. 9A is a top view of the inner compartment cup 50 that further illustrates some of the same features shown in FIG. 7 and FIG. 8.
Figure 13:
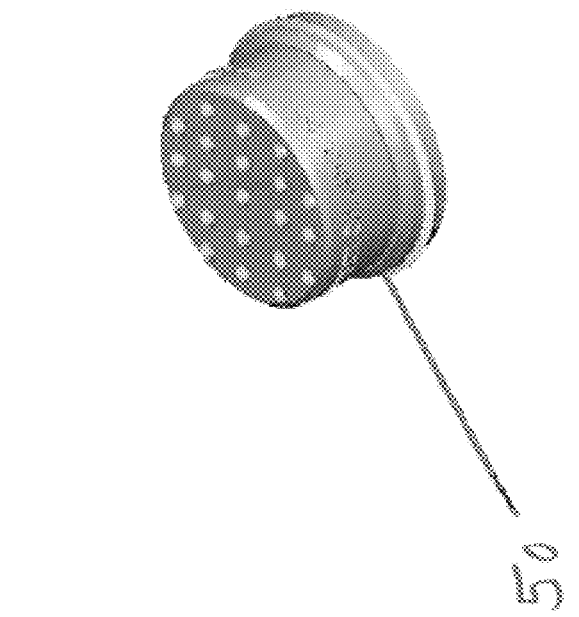
Figure 12:
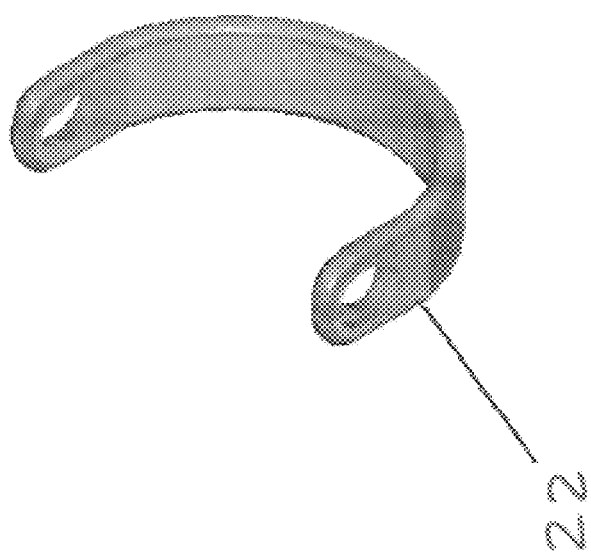
Figure 15:
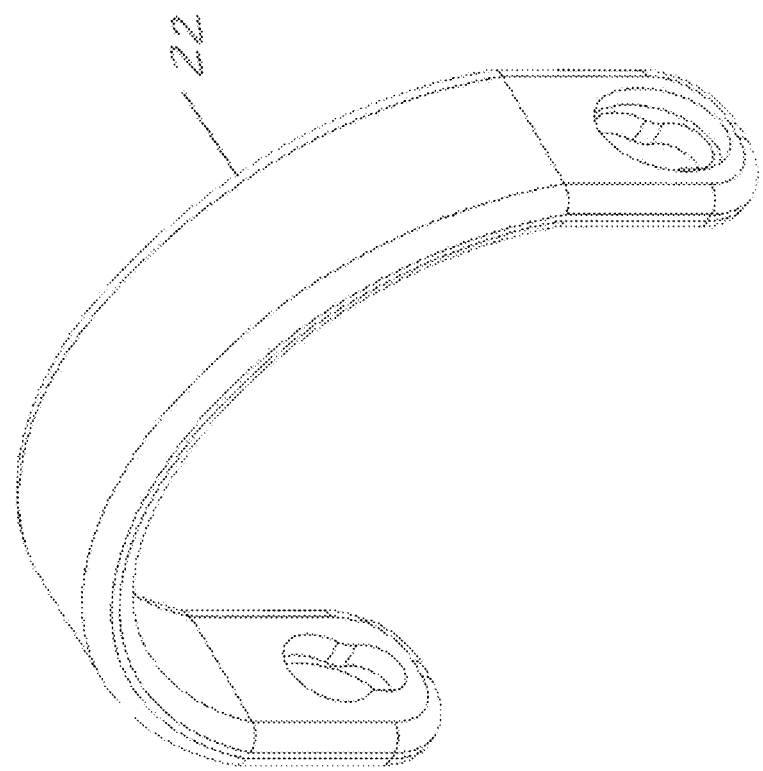
Figure 14:
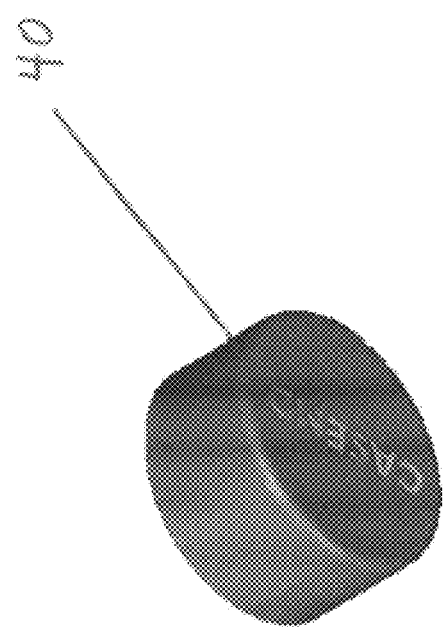
Figure 16:
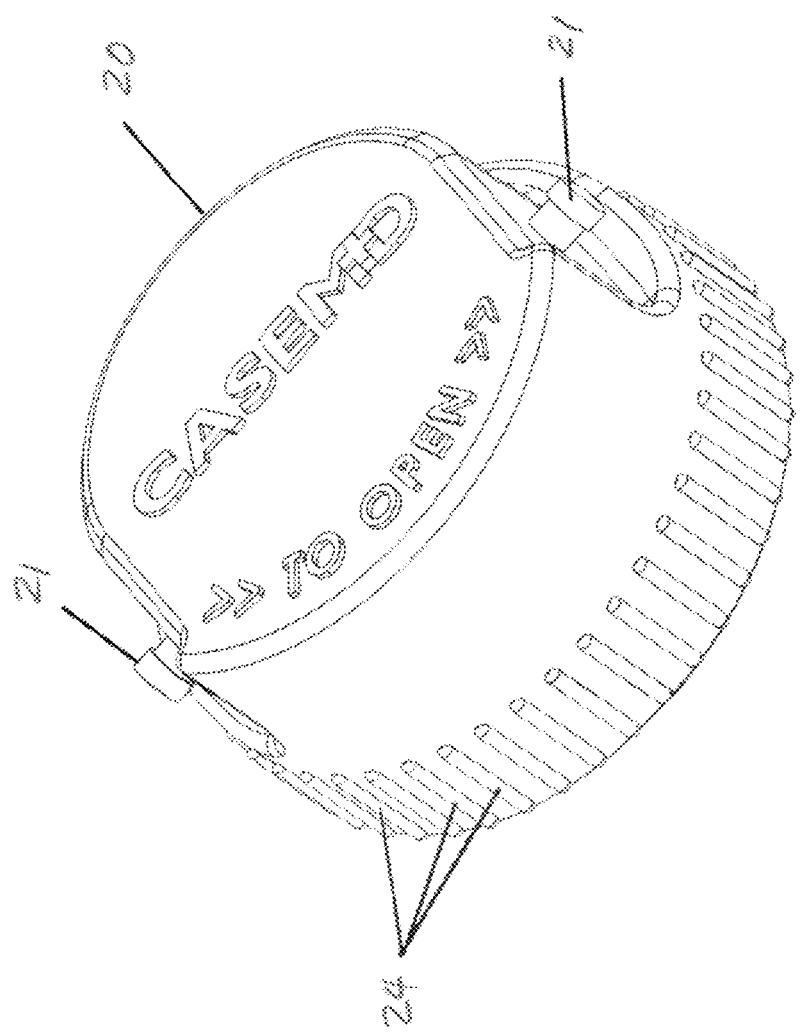

FIG. 9B is a section view of the upper half of the medication container 10 in a storage and/or transport-ready configuration. FIG. 9B illustrates many of the same features already illustrated in FIGS. 1-9A and discussed above, but FIG. 9B also illustrates that when the inner compartment cup 50 is affixed to the top cap 20, the inner compartment cup 50 and the open cylindrical void within the top cap 20 (formerly referred to as an interior compartment in FIG. 6) cooperate to define a second medication storage chamber 70 wherein a medication or desiccant material may be stored, or other materials such as those discussed in Paragraph 0034 above may be stored or transported. FIG. 9B also illustrates that when the inner compartment cup 50 is affixed to the top cap 20, and when the top cap 20 is further interfaced to the vacuum flask cylinder 30, the inner compartment cup 50 is suspended from the bottom of the top cap 20 such that at least part of the inner compartment cup 50 and at least part of the second medication storage chamber 70 are situated or "nested" within a portion of the first medication storage chamber 37. The two storage chambers of the medication container may communicate with each other by means of the multiplicity of ventilation holes 54 that are the optional perforations in the floor of the inner compartment cup discussed previously.

FIGS. 10-16 are additional views of components of the medication container that are intended to help illustrate the invention.

Figure 17:
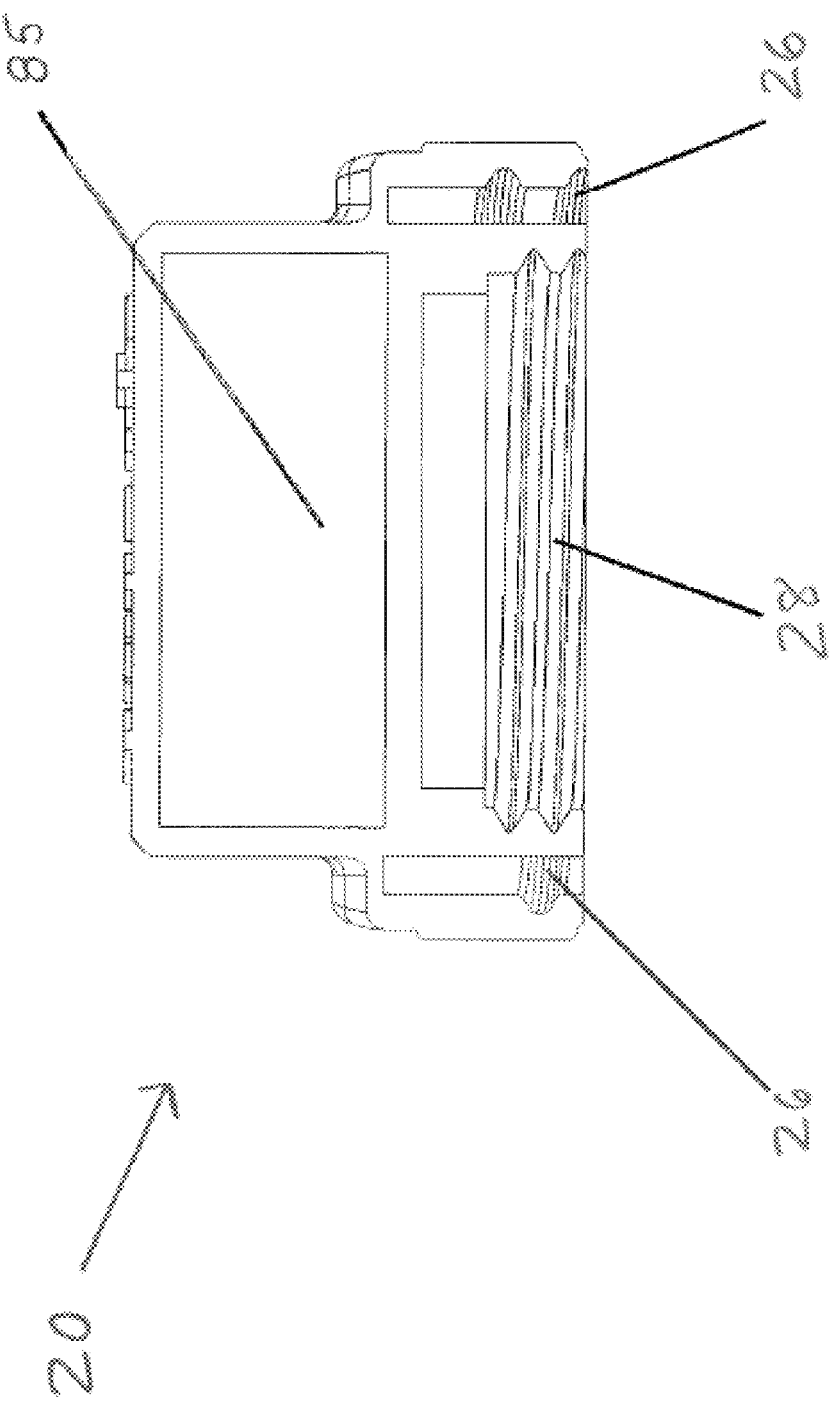
Figure 18:
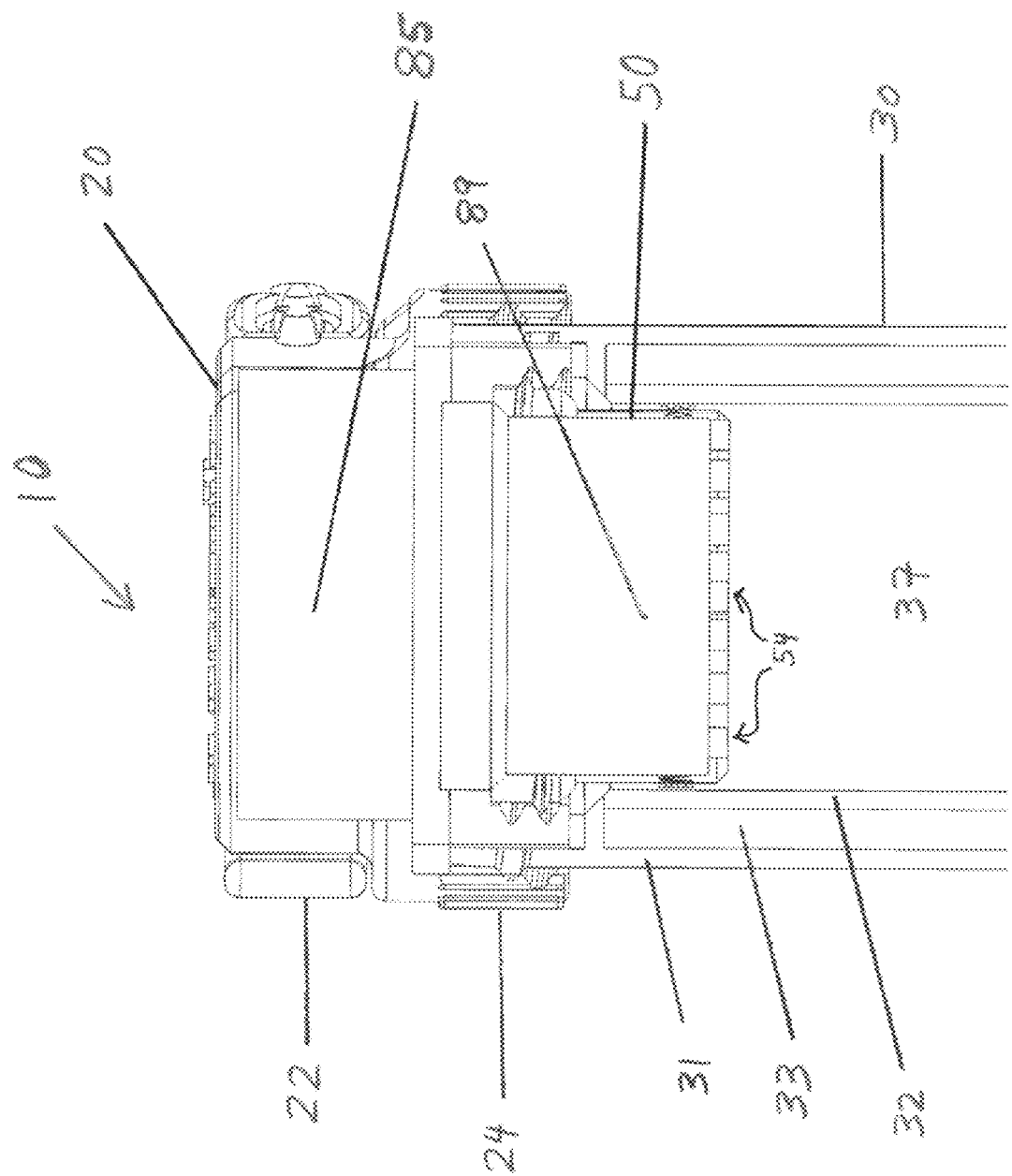

FIGS. 17-18 illustrate the preferred embodiment discussed above in paragraph 0026 of this application. As discussed in paragraph 0026, the top cap 20 may be provided with an interior top cap chamber 85 that is separate from a pendent top cap cup 89. In such a preferred embodiment, the interior top cap chamber 85 will serve as a first additional storage space in addition to the first medication storage chamber 37, while the pendent top cap cup 89 will serve as a second additional storage space in addition to the first medication storage chamber 37.

A cylindrical protection member may optionally be removably inserted within the first medication storage chamber in order to provide an additional thermal insulating layer and, secondarily, a cushioning layer between the inner surface of the inner vessel wall and a medication, bottle, or vial to be stored and/or transported within the medication container. Such cylindrical protection member will primarily serve as a further layer of thermal insulation for the medication being stored or transported within the first medication storage chamber of the medication container. The cylindrical protection member may also act as a shock absorbing prophylactic against breakage or fracture of any medication, bottle, or vial that may be stored or transported within the first medication storage chamber. To the extent that such a cylindrical protection member is removably inserted into the first medication storage chamber, it will be made of a shock absorbing material such as neoprene, rubber or foam or other similar material that is thermally insulating and also may absorb shock or sudden jarring movements. Such optional cylindrical protection member is a cylinder with a floor and cylindrical side wall, but with an open top that in which the medication may be inserted. The cylindrical protection member may, alternatively, have a top that opens and may be closed around the top of a stored medication. The optional cylindrical protection member will not cling tightly as a sleeve to the outside of a medication container or medication bottle stored within the first medication storage chamber, but rather, it will simply serve as an insulating and shock absorbing cushion between the inner surface of the inner vessel wall and any medication or medication bottle that might be stored within the medication container. Such cylindrical protection member is not illustrated in this application.

It should be appreciated that various components and various relationships between the components of the medication container could be altered by a person skilled in the art without changing the inventive concepts hereby disclosed. For instance, though the top cap could be reversibly attached to the top of the double-walled vacuum flask cylinder, it could also be reversibly attached by means of a reversibly-yieldable rim lid seal, a snapping mechanism, a hinge and latch combination, or many other easily appreciated means for attaching the top cap to the vacuum flask cylinder. Likewise, though the inner compartment cap has been described and illustrated as being reversibly attached to the bottom part of the top cap in order to form the second medication storage chamber that can be nested within the top portion of the first medication storage chamber when the medication container is closed and ready for transport, the inner compartment cup could also be attached to the top cap by means of a reversiby-yieldable lid rim type seal, a snapping mechanism or snap in place means such as a raised lip and an annular groove, a hinge or a hinge and latch combination, or many other suitable means. Furthermore, the inner compartment cup has been described as having a multiplicity of perforations in its floor, but that is only one potential embodiment, and the floor of the inner compartment cup could be solid without perforations if desired.

Further still, rather than having a top cap and cylinder engagement as described above, an alternative design (not shown in the drawings) may involve a top cap with a protrusion that, when engaged with the cylinder, extends into, rather than outwardly surrounds the top end of the cylinder. In such case, the protrusion may include exterior threads that interface with interior threads formed on an interior surface of the opening into the interior cavity of the cylinder.

It is an important feature of the invention that the grippable protrusion members and the flip-up handle of the top cap make the medication container more easily used by patients with arthritic conditions in their hands or fingers. Constructing the top cap and the grippable protrusion members from plastic will also make the device more user friendly. It would also be possible to permanently adhere a layer of rubber or rubberized plastic material around the circular edge of the top cap in place of the protrusion members illustrated without departing from the spirit of the invention to the extent that such a layer would also enhance gripping the top cap and opening and closing the medication container by patients with arthritis or an otherwise weak grip.

The invention claimed is:

1. A medication container comprised of:
    a top cap with an upper surface, an annular apron extending from a circumferential margin of said top cap, an interior void cooperatively defined by an inner face of said upper surface and an interior surface of said apron, and textured external surface of an exterior surface of said apron;
    a flip-up handle pivotably attached to said exterior surface of said apron;
    a double-walled vacuum flask cylinder having a top end and a bottom end, and defining an interior cavity, an opening at said top end, and said top end being configured for reversible, substantially sealed, air-tight engagement with said top cap; and
    an inner compartment cup configured for reversible interfacing with said top cap and when so interfaced with said top cap, and when said cap is interfaced with said top end of said double-walled vacuum flask cylinder, extends into said interior cavity, wherein said inner compartment cup defines a storage compartment that extends into said interior cavity, said storage compartment having a base surface positioned substantially opposite said top cap, wherein said base surface has at least one aperture.

2. A medication container comprised of:
    a top cap with an upper surface and a lower surface, said lower surface being configured with a cylinder engagement protrusion;
    a flip-up handle pivotably attached to said exterior surface of said top cap;
    a double-walled vacuum flask cylinder having a top end and a bottom end, and defining an interior cavity, an opening at said top end, and said top end being configured for reversible, substantially sealed, air-tight engagement with said cylinder engagement protrusion of said top cap; and
    an inner compartment cup configured for reversible interfacing with said cylinder engagement protrusion of said top cap and when so interfaced, and when said top cap is interfaced with said top end of said double-walled vacuum flask cylinder, extends into said interior cavity, wherein said inner compartment cup defines a storage compartment that extends into said interior cavity, said storage compartment having a base surface positioned substantially opposite said top cap, wherein said base surface has at least one aperture.

* * * * *